(12) United States Patent
McCue et al.

(10) Patent No.: US 11,284,568 B2
(45) Date of Patent: Mar. 29, 2022

(54) HEDGE TRIMMER

(71) Applicant: MILWAUKEE ELECTRIC TOOL CORPORATION, Brookfield, WI (US)

(72) Inventors: Shane McCue, Greenfield, WI (US); John L. Whealon, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 124 days.

(21) Appl. No.: 16/417,715

(22) Filed: May 21, 2019

(65) Prior Publication Data
US 2019/0357445 A1 Nov. 28, 2019

Related U.S. Application Data

(60) Provisional application No. 62/675,662, filed on May 23, 2018.

(51) Int. Cl.
*A01G 3/053* (2006.01)
*A01G 3/04* (2006.01)

(52) U.S. Cl.
CPC ...... *A01G 3/053* (2013.01); *A01G 2003/0461* (2013.01)

(58) Field of Classification Search
CPC ...... A01G 3/053; A01G 3/0535; A01G 3/047; A01G 3/0475; A01G 2003/0461
See application file for complete search history.

(56) References Cited

U.S. PATENT DOCUMENTS

| 1,937,586 | A | * | 12/1933 | Ortt | A01G 3/053 |
| | | | | | 30/199 |
| 4,197,764 | A | | 4/1980 | Auernhammer | |
| 4,207,675 | A | | 6/1980 | Causey et al. | |
| 6,006,434 | A | * | 12/1999 | Templeton | A01D 34/90 |
| | | | | | 30/276 |
| 6,182,367 | B1 | | 2/2001 | Janczak | |
| 6,192,769 | B1 | | 2/2001 | Stark et al. | |
| 6,598,299 | B2 | | 7/2003 | Stark et al. | |
| 6,651,347 | B2 | | 11/2003 | Uhl | |
| 6,735,873 | B2 | | 5/2004 | Langhans et al. | |

(Continued)

FOREIGN PATENT DOCUMENTS

| CN | 2565254 Y | 8/2003 |
| CN | 101006763 A | 8/2007 |

(Continued)

*Primary Examiner* — Hwei-Siu C Payer
(74) *Attorney, Agent, or Firm* — Michael Best & Friedrich LLP

(57) ABSTRACT

An outdoor tool includes a powerhead, a tool portion operatively powered by the powerhead, an elongated shaft assembly extending along a shaft axis between the powerhead and the tool portion, and a locking mechanism. The tool portion includes a first housing fixed to the shaft assembly, a second housing coupled to the first housing for pivoting movement about a pivot axis, and a blade assembly supported by the second housing. The locking mechanism is movable between a locked position, in which relative movement between the second housing and the first housing is prevented, and an unlocked position, in which the second housing is movable relative to the first housing.

19 Claims, 16 Drawing Sheets

(56) References Cited

U.S. PATENT DOCUMENTS

| | | | |
|---|---|---|---|
| 7,484,300 B2 * | 2/2009 | King | A01G 3/08 30/166.3 |
| 7,752,760 B2 | 7/2010 | Baskar et al. | |
| 7,930,833 B2 | 4/2011 | Baskar et al. | |
| 7,992,308 B1 | 8/2011 | Fisher | |
| 8,186,066 B2 | 5/2012 | Doragrip et al. | |
| 8,793,886 B2 | 8/2014 | Yamaoka et al. | |
| 9,014,320 B1 | 4/2015 | Song et al. | |
| 9,314,916 B2 | 4/2016 | Tsuchiya | |
| 10,375,896 B2 | 8/2019 | Sheffer et al. | |
| 2002/0194739 A1 | 12/2002 | Krane et al. | |
| 2003/0136003 A1 | 7/2003 | Casttelmani | |
| 2005/0172498 A1 | 8/2005 | Casttelmani | |
| 2007/0234579 A1 | 10/2007 | Patrick | |
| 2010/0126029 A1 | 5/2010 | Peterson | |
| 2017/0303474 A1 | 10/2017 | Sheffer et al. | |
| 2018/0023680 A1 * | 1/2018 | Barth | F16H 57/02 30/208 |
| 2019/0357445 A1 * | 11/2019 | McCue | A01G 3/053 |
| 2019/0358801 A1 * | 11/2019 | McCue | B25F 3/00 |

FOREIGN PATENT DOCUMENTS

| | | | |
|---|---|---|---|
| CN | 201171294 Y | 12/2008 | |
| CN | 201192005 Y | 2/2009 | |
| CN | 201248287 Y | 6/2009 | |
| CN | 101627703 A | 1/2010 | |
| CN | 202127644 U | 2/2012 | |
| CN | 203353250 U | 12/2013 | |
| CN | 203708894 U | 7/2014 | |
| CN | 204132041 U | 2/2015 | |
| CN | 105432337 A | 3/2016 | |
| CN | 105605051 A | 5/2016 | |
| CN | 205371190 U | 7/2016 | |
| CN | 205378578 U | 7/2016 | |
| CN | 206413457 U | 8/2017 | |
| DE | 202016105276 U1 | 12/2016 | |
| EP | 0879553 A2 | 11/1998 | |
| EP | 1059025 A2 | 12/2000 | |
| EP | 1627562 A1 | 2/2006 | |
| EP | 1922916 A1 | 5/2008 | |
| FR | 2029288 A5 * | 10/1970 | A01G 3/053 |
| FR | 2575363 A1 * | 7/1986 | B23D 49/006 |
| WO | WO 2007051553 A1 | 3/2007 | |

* cited by examiner

HEDGE TRIMMER

CROSS-REFERENCE TO RELATED APPLICATIONS

This application claims priority to U.S. Provisional Patent Application No. 62/675,662, filed on May 23, 2018, the entire contents of which is incorporated herein by reference.

FIELD OF THE INVENTION

The invention generally relates to outdoor tools, and, more particularly, to a hedge trimmer.

BACKGROUND OF THE INVENTION

Outdoor tools, such as hedge trimmers, are used for performing outdoor tasks, such as trimming hedges.

SUMMARY OF THE INVENTION

In one independent aspect, an outdoor tool, such as a hedge trimmer, generally includes a powerhead, a tool portion operatively powered by the powerhead, an elongated shaft assembly extending along a shaft axis between the powerhead and the tool portion, and a locking mechanism. The tool portion includes a first housing fixed to the shaft assembly, a second housing coupled to the first housing for pivoting movement about a pivot axis, and a blade assembly supported by the second housing. The locking mechanism is movable between a locked position, in which relative movement between the second housing and the first housing is prevented, and an unlocked position, in which the second housing is movable relative to the first housing.

In another independent aspect, an outdoor tool, such as a hedge trimmer, generally includes an elongated shaft assembly extending along a shaft axis, a powerhead coupled to the shaft assembly at a first end, a tool portion coupled to the shaft assembly at a second end opposite the first end, the hedge trimmer portion being powered by the powerhead, and a locking mechanism. The tool portion includes a first housing fixed to the shaft assembly, a second housing rotatably coupled to the first housing for pivoting movement relative to the first housing about a pivot axis, and a blade assembly supported by the second housing. The locking device includes a first member supported on the second housing to extend about the pivot axis, the first member defining a plurality of recesses, and a second member supported by the first housing and selectively engageable in each recess to lock the second housing in a corresponding position relative to the first housing.

Other independent aspects of the invention may become apparent by consideration of the detailed description and accompanying drawings.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

DETAILED DESCRIPTION

Figure 1:
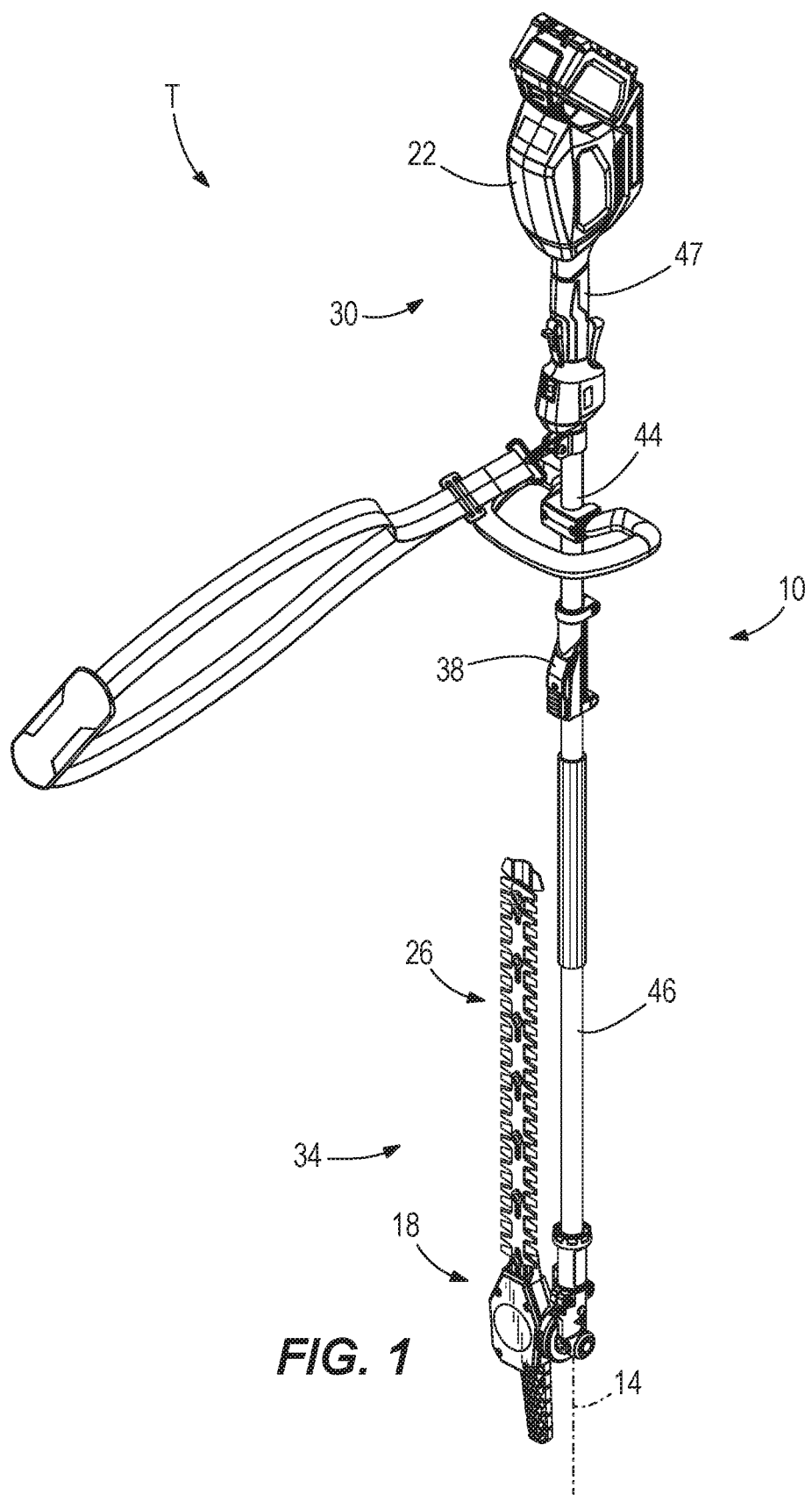
FIG. 1 is a perspective view of an outdoor tool, such as a hedge trimmer, illustrated in a storage position.

FIG. 1 illustrates an outdoor tool T, such as a hedge trimmer, for use in performing outdoor tasks such as trimming hedges. The outdoor tool T includes an elongated shaft assembly 10 extending along a shaft axis 14, a hedge trimmer head 18 at one end of the shaft assembly 10, and a powerhead 22 at an opposite end of the shaft assembly 10. The hedge trimmer head 18 includes a blade assembly 26 for performing trimming. The powerhead 22 generates a motive force to drive the blade assembly 26 during operation of the outdoor tool T.

Figure 23:
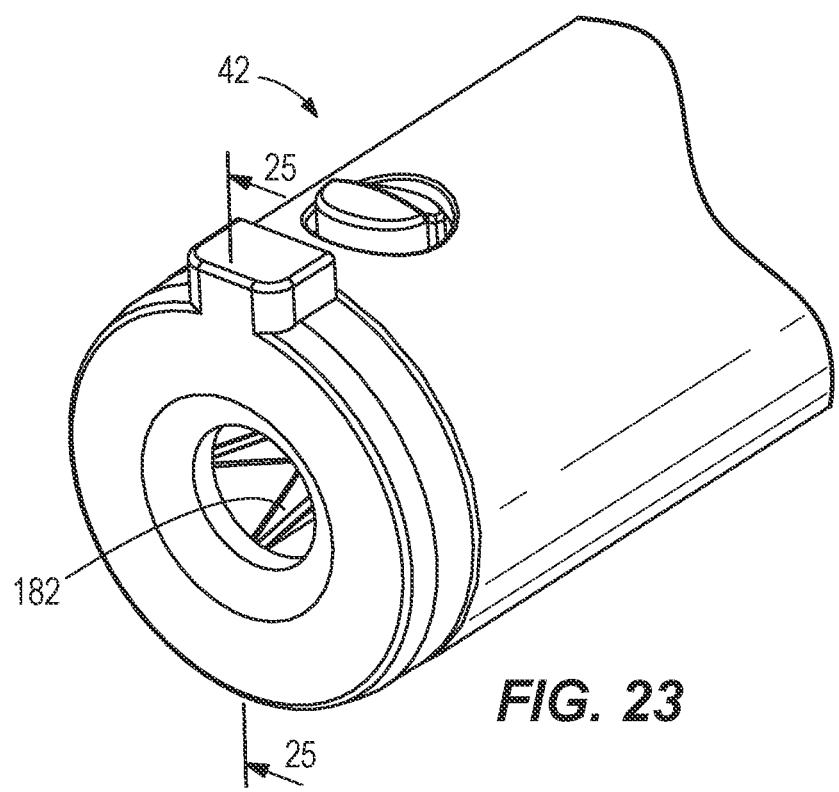
FIG. 23 is a perspective end view of a connecting portion of the hedge trimmer attachment of FIG. 2.

In the illustrated construction, the outdoor tool T includes a powerhead unit 30 and a tool portion or attachment unit 34 (e.g., a hedge trimmer attachment, a string trimmer attachment, a pole saw attachment, etc., including, e.g., a tool end, an operating tool, a tool portion, etc.) selectively and removably coupled to the powerhead unit 30 via connecting portions 38, 42 (FIG. 23). In the illustrated construction, the attachment unit 34 is a hedge trimmer attachment. The shaft assembly 10 includes first and second shaft segments 44, 46. The powerhead unit 30 includes the powerhead 22 with an operator's handle 47, the first shaft segment 44, and the first connecting portion 38. The attachment unit 34 includes the hedge trimmer head 18, the second shaft segment 46, and the second connecting portion 42. In other constructions (not shown), the outdoor tool T is a standalone tool so that the hedge trimmer head 18 and the powerhead 22 are not separable.

Figures 17, 18:
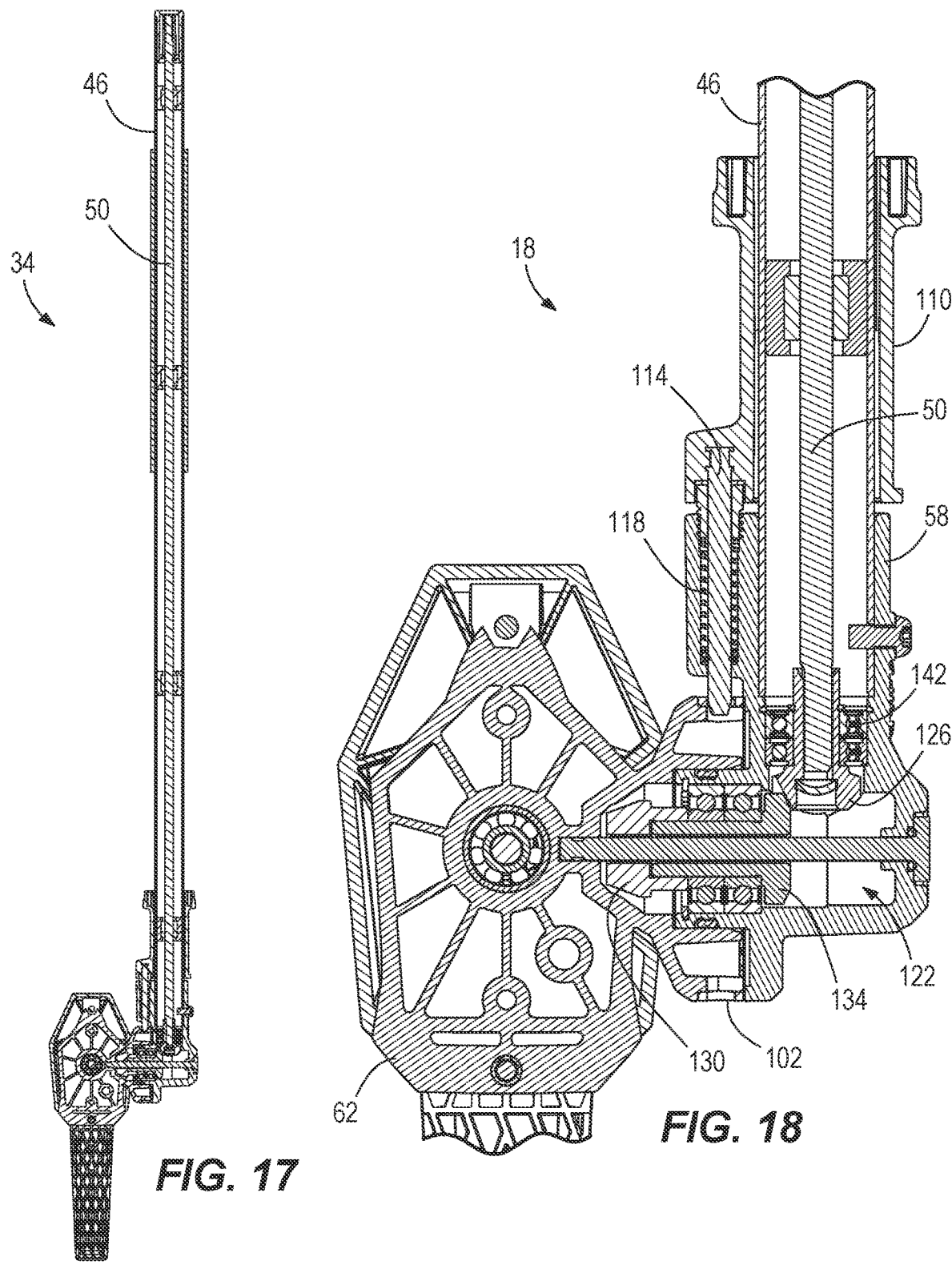
FIG. 17 is a cross-sectional front view of the hedge trimmer attachment of FIG. 2, taken generally along line 17-17 of FIG. 2.
FIG. 18 is a cross-sectional front view of an enlarged portion of the hedge trimmer attachment as shown in FIG. 17.
Figure 26:
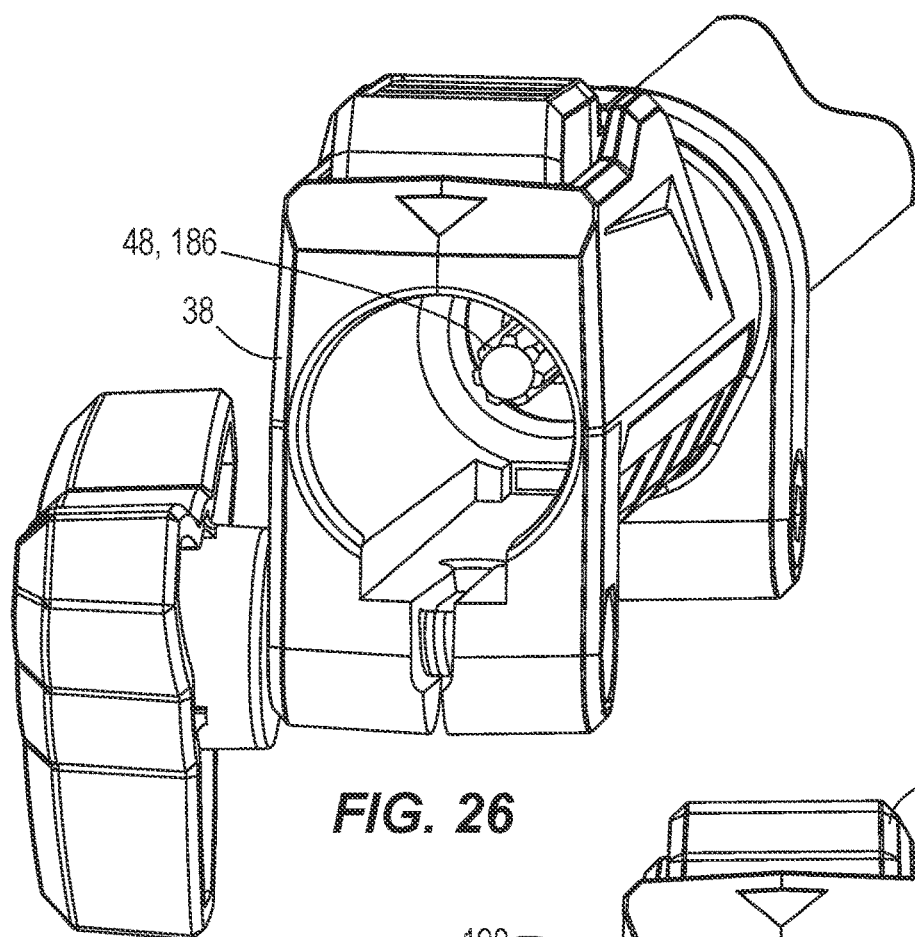
FIG. 26 is a perspective end view of a connecting portion of the powerhead shown in FIG. 1.

A first driveshaft segment 48 (partially shown in FIGS. 26-27) extends axially within the first shaft segment 44 along the shaft axis 14 and is drivingly coupled to the powerhead 22. A second driveshaft segment 50 (FIG. 17) extends axially within the second shaft segment 46 and is drivingly coupled to the hedge trimmer head 18. When the attachment unit 34 is attached to the powerhead unit 30, the first driveshaft segment 48 couples to the second driveshaft segment 50 to drivingly transmit rotary power from the powerhead 22 to the hedge trimmer head 18.

A similar powerhead unit is described and illustrated in U.S. Provisional Patent Application No. 62/675,661, filed May 23, 2018, entitled "POWERHEAD UNIT FOR TOOL", and in corresponding U.S. patent application Ser. No. 16/417,713, filed May 21, 2019, entitled "POWERHEAD UNIT FOR TOOL", the entire contents of which is hereby incorporated by reference.

Figure 2:
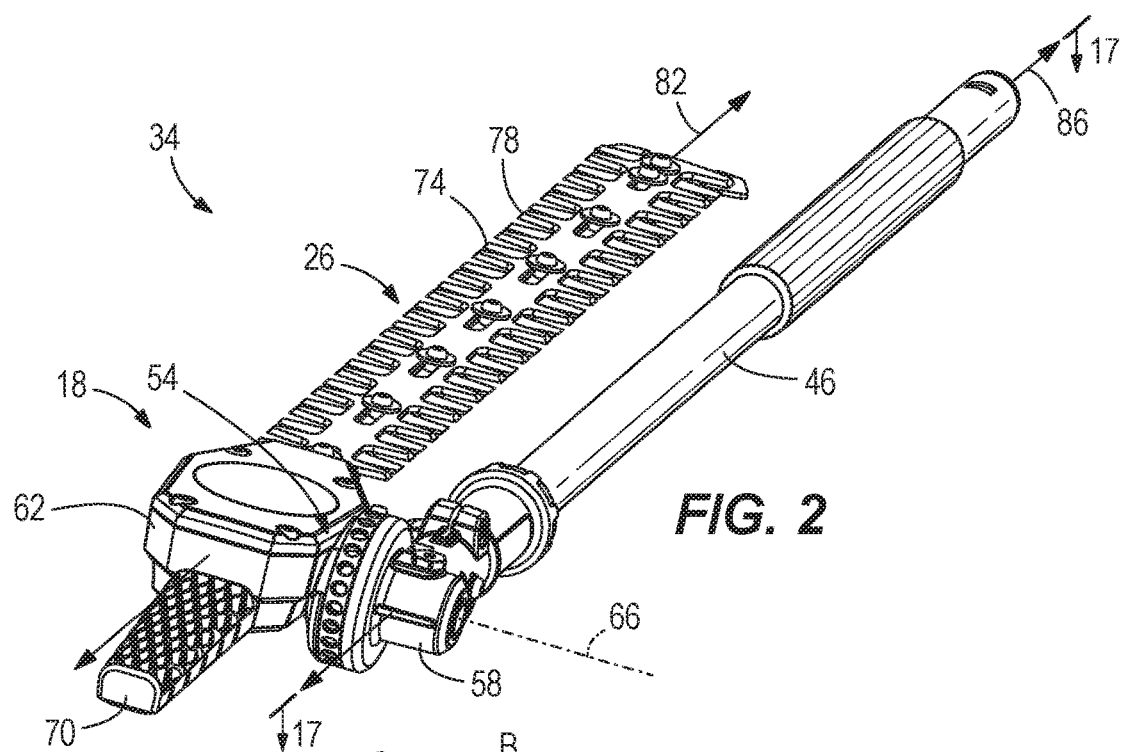
FIG. 2 is a perspective view of a hedge trimmer attachment shown in FIG. 1.
Figure 3:
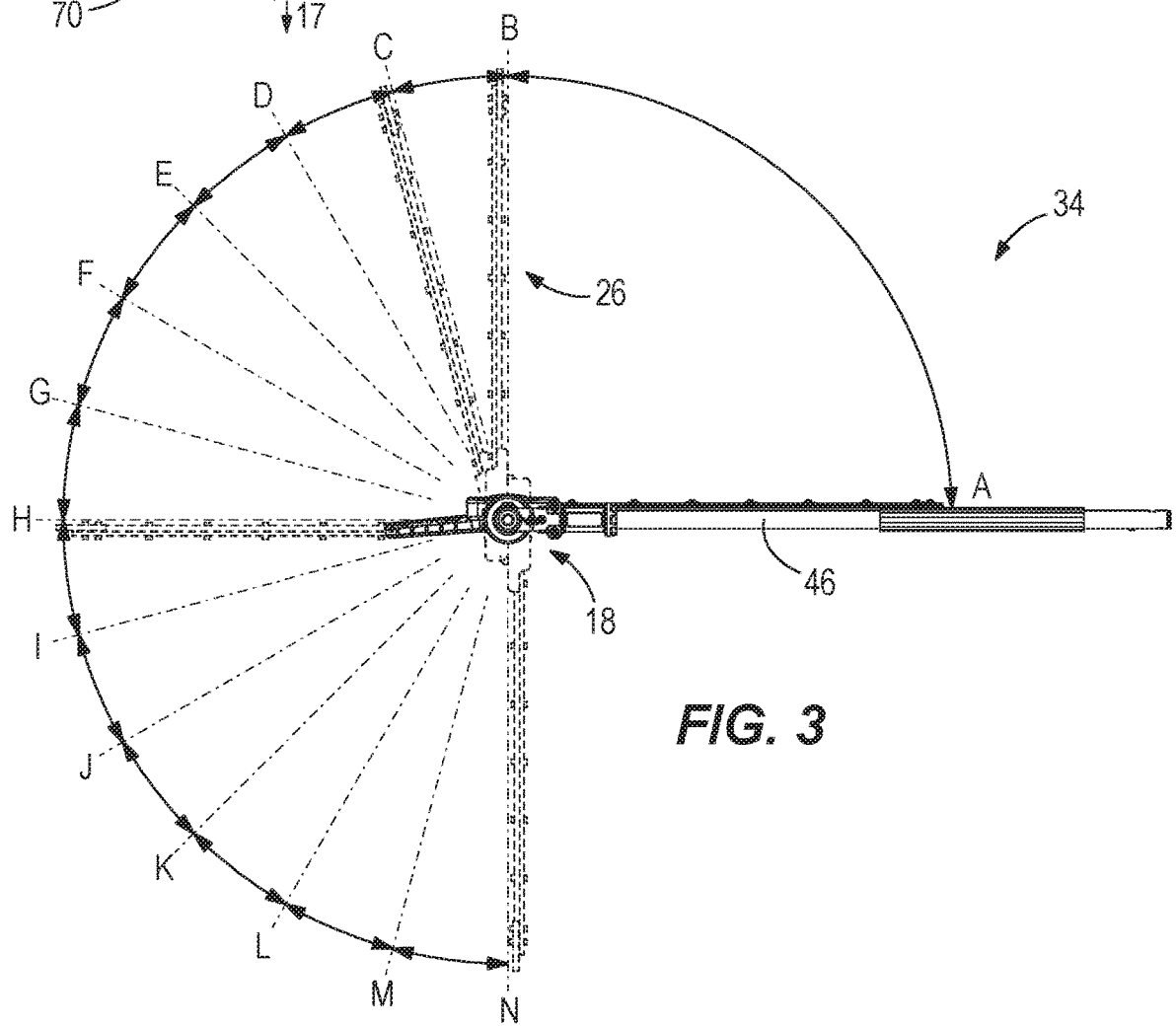
FIG. 3 is a schematic view of the hedge trimmer attachment of FIG. 2, illustrating adjustment of a blade assembly.
Figure 4:
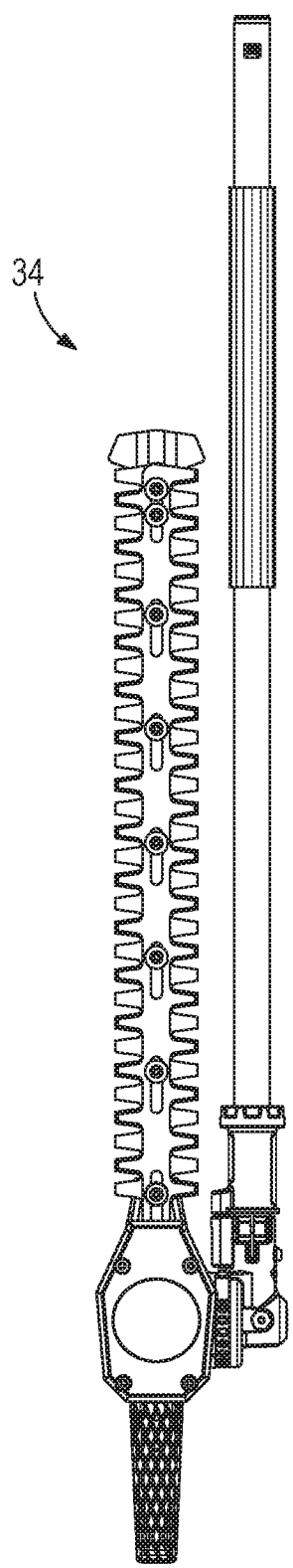
FIG. 4 is a front view of the hedge trimmer attachment of FIG. 2.
Figure 5:
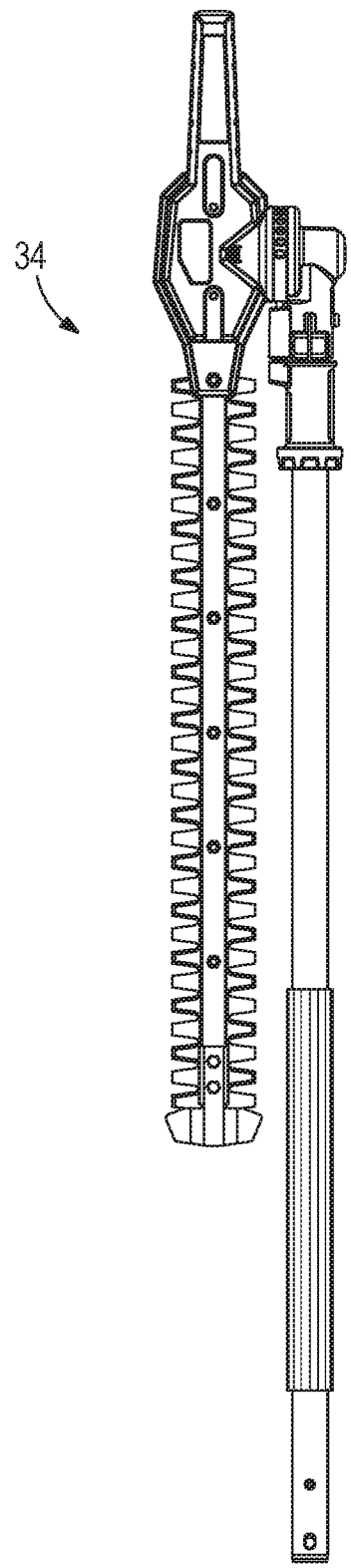
FIG. 5 is a rear view of the hedge trimmer attachment of FIG. 2.
Figures 6, 7:
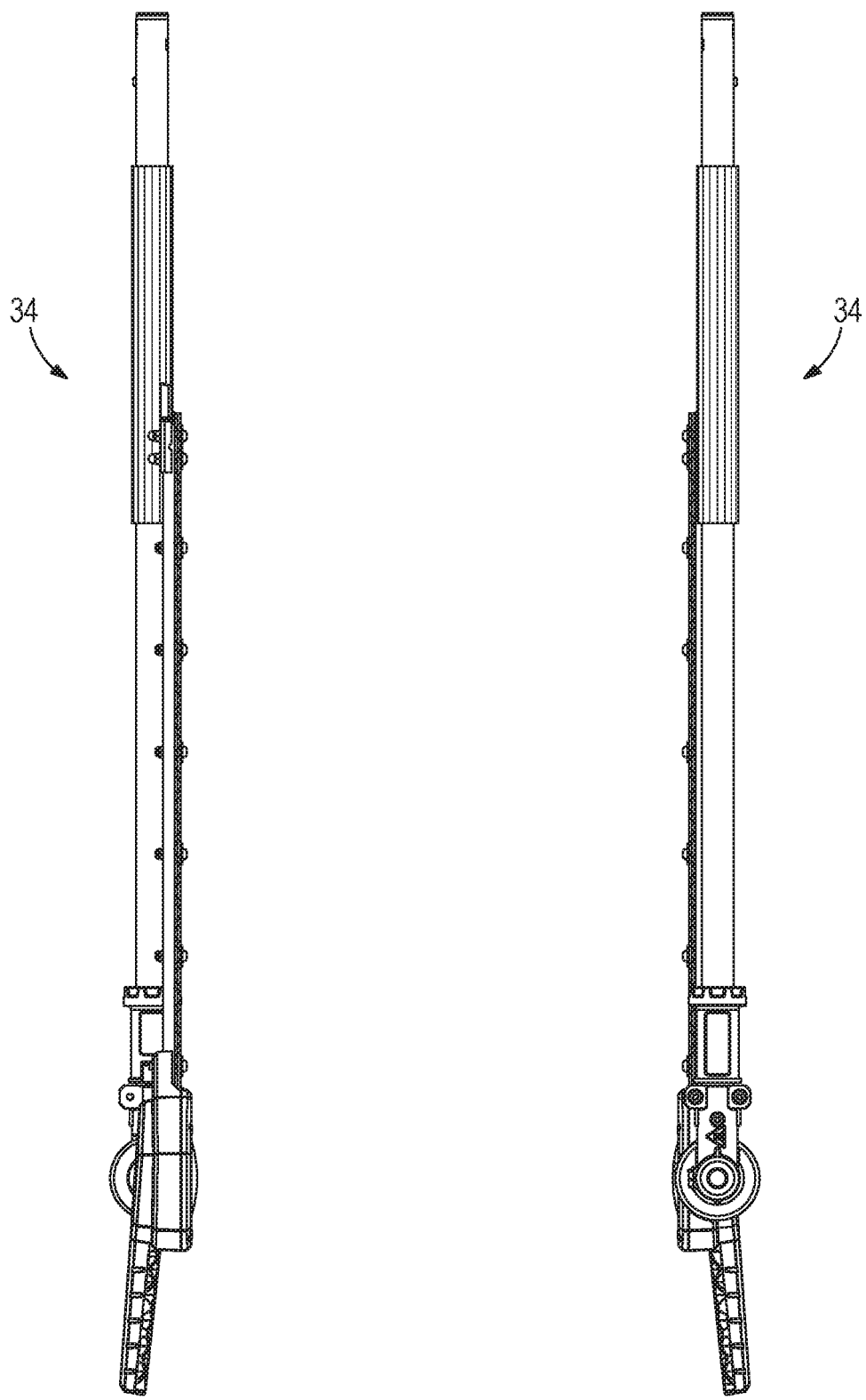
FIG. 6 is a side view of the hedge trimmer attachment of FIG. 2.
FIG. 7 is another side view of the hedge trimmer attachment of FIG. 2.

With reference to FIGS. 2-3, the hedge trimmer head 18 includes a pivot mechanism 54 having a fixed housing 58 coupled to the second driveshaft segment 50 and a pivoting housing 62 supporting the reciprocating blade assembly 26. The movable housing 62 is selectively pivotable relative to the fixed housing 58 about a pivot axis 66 and includes a handle 70 extending away from the movable housing 62 substantially opposite the blade assembly 26.

The movable housing 62, with the handle 70 and the blade assembly 26, is selectively pivotable about the pivot axis 66 between a number of positions relative to the fixed housing 58 including, in the illustrated construction, a storage position A (FIG. 3), substantially alongside and aligned with the shaft assembly 10, and one or more use positions B, C, . . . n. In the illustrated construction, the hedge trimmer head 18 is movable between thirteen use positions B-N, with each use position B-N being located approximately fifteen degrees apart.

In other constructions (not shown), the hedge trimmer head 18 may include fewer or more use positions. Also, the use positions may be located at equal or unequal intervals about the pivot axis 66.

In the illustrated embodiment, use position B is a first use position, use positions C-M are an intermediate use positions, and use position N is a furthest use position defining the range of use positions between positions B and N. In the illustrated construction, the first use position B is located approximately 90 degrees from the storage position A (in the counter-clockwise direction as illustrated in FIG. 3), and the use position N is located approximately 270 degrees from the storage position A (again, in the counter-clockwise direction in FIG. 3).

The blade assembly 26 may be prevented from being operated at angles of less than 90 degrees or greater than 270 degrees from the storage position A, in order to prevent the outdoor tool T from being operated in positions in which the blade assembly 26 extends towards the powerhead 22 and the operator's handle 47. In alternative constructions (not shown), in positions outside of the use range (less than about 90 degrees and more than about 270 degrees from the storage position A), the drive arrangement between the powerhead 22 and the hedge trimmer head 18 is disabled. For example, in such constructions, in the non-use positions, a pin (not shown) may engage with and stall the motor (not shown).

With reference to FIG. 2, in the illustrated construction, the blade assembly 26 includes two relatively-reciprocating blades 74, 78 interfacing at a blade plane 82. The shaft axis 14 and the pivot axis 66 intersect one another and together define a plane 86 that, in the storage position, is substantially parallel to the blade plane 82. In other constructions, the blade plane 82 and the shaft plane 86 may be substantially co-planar, perpendicular or skewed with respect to one another.

The attachment unit includes a locking assembly operable to selectively lock the movable housing 62, with the handle 70 and the blade assembly 26, in one or more positions relative to the fixed housing 58. In the illustrated construction, as discussed below, the locking assembly includes a positive locking arrangement. In other constructions (not shown), the locking assembly may include a different locking arrangement (e.g., a frictional locking arrangement, a clamping locking arrangement, etc.) as an alternative to or in addition to the illustrated mechanical locking arrangement.

Figure 8:
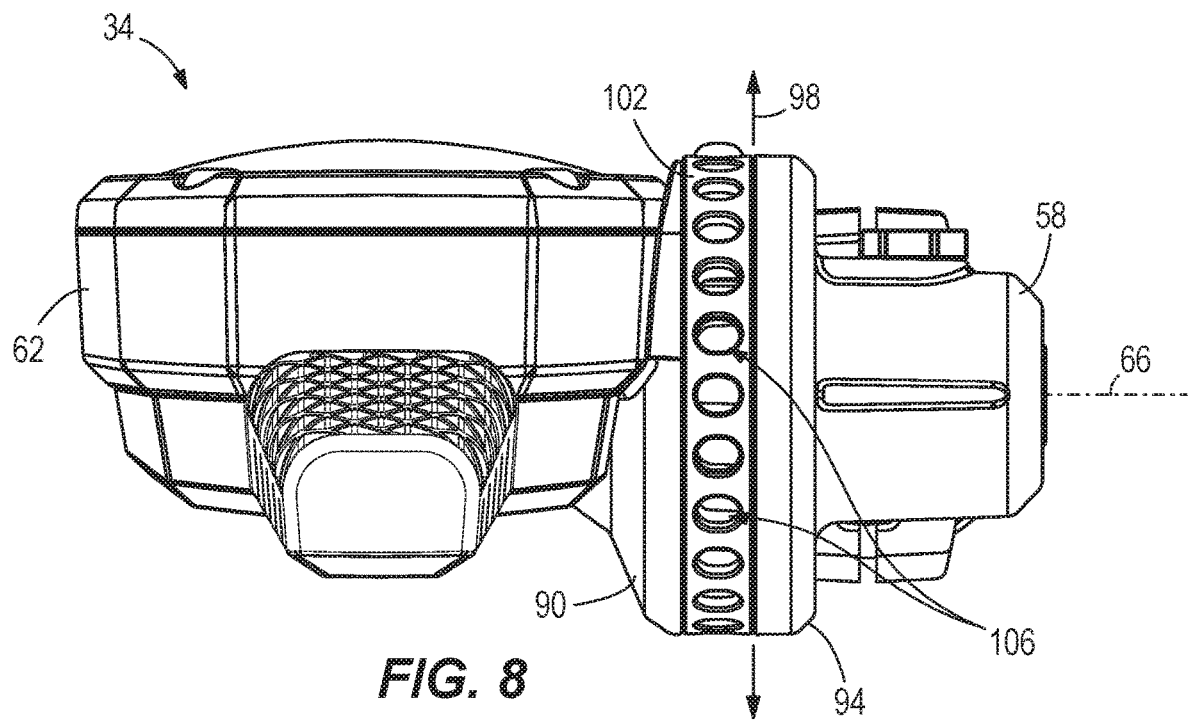
FIG. 8 is an end view of the hedge trimmer attachment of FIG. 2.
Figure 9:
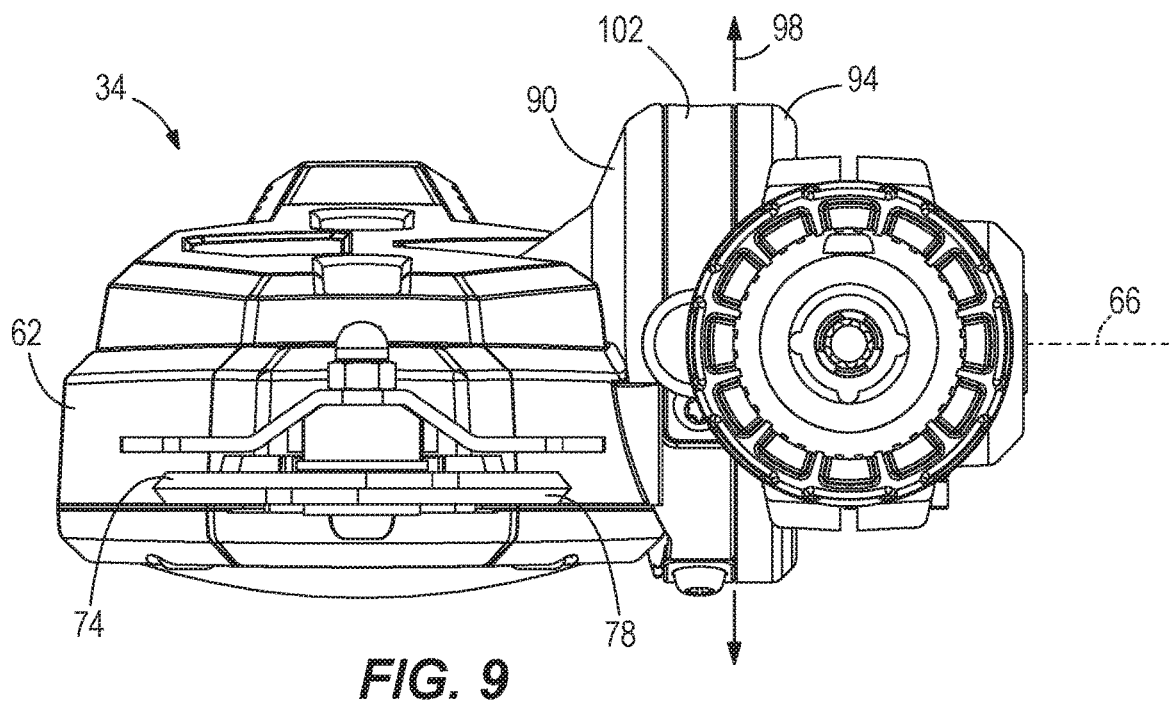
FIG. 9 is another end view of the hedge trimmer attachment of FIG. 2.

With reference to FIGS. 8-9, the movable housing 62 includes a locking wheel 90, and the fixed housing 58 includes a hub 94 interfacing with the locking wheel 90 at a wheel plane 98. In the illustrated construction, the wheel plane 98 is substantially perpendicular to the planes 82, 86. In other constructions (not shown), the wheel plane 98 can be parallel to, co-planar with, skewed from the planes, 82, 86.

Figure 14:
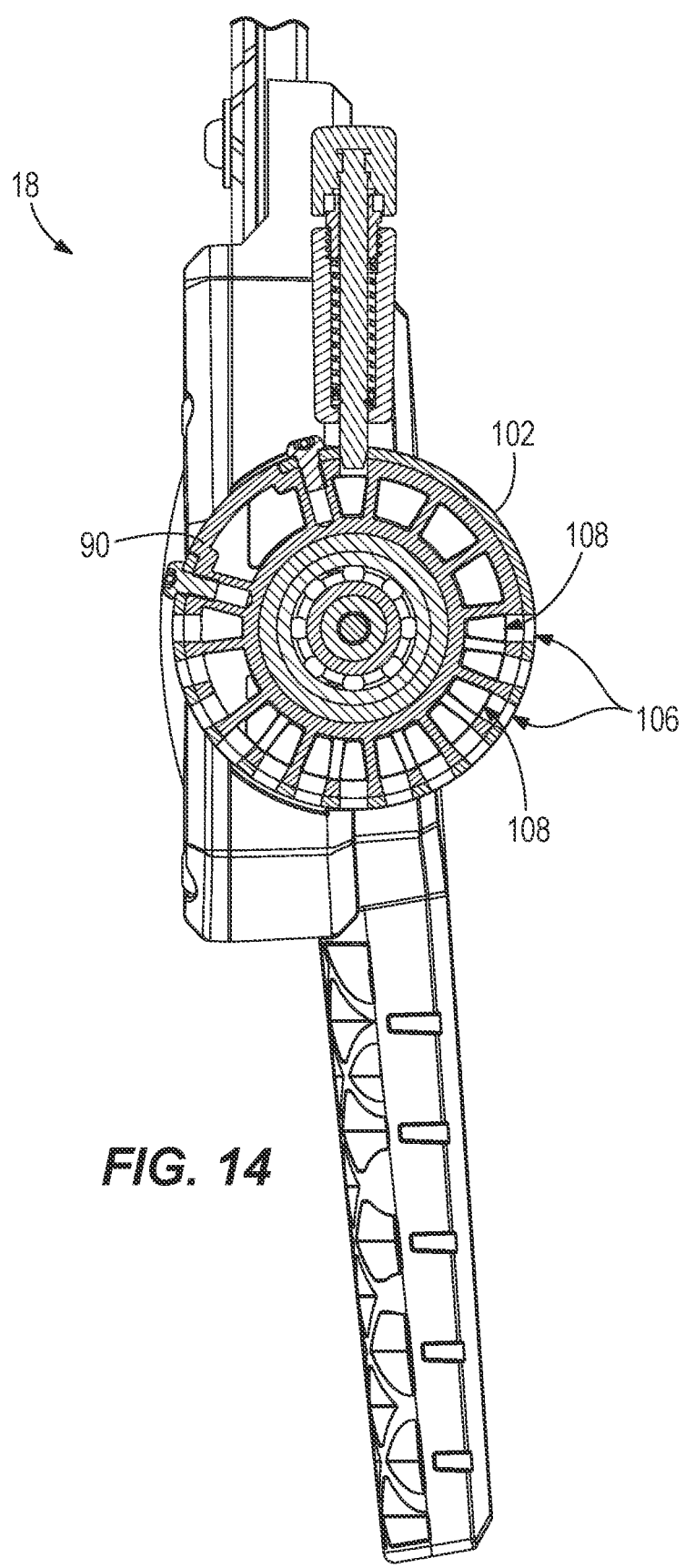
FIG. 14 is a cross-sectional side view of the portion of the hedge trimmer attachment as shown in FIG. 10, taken generally along line 14-14.
Figure 16:
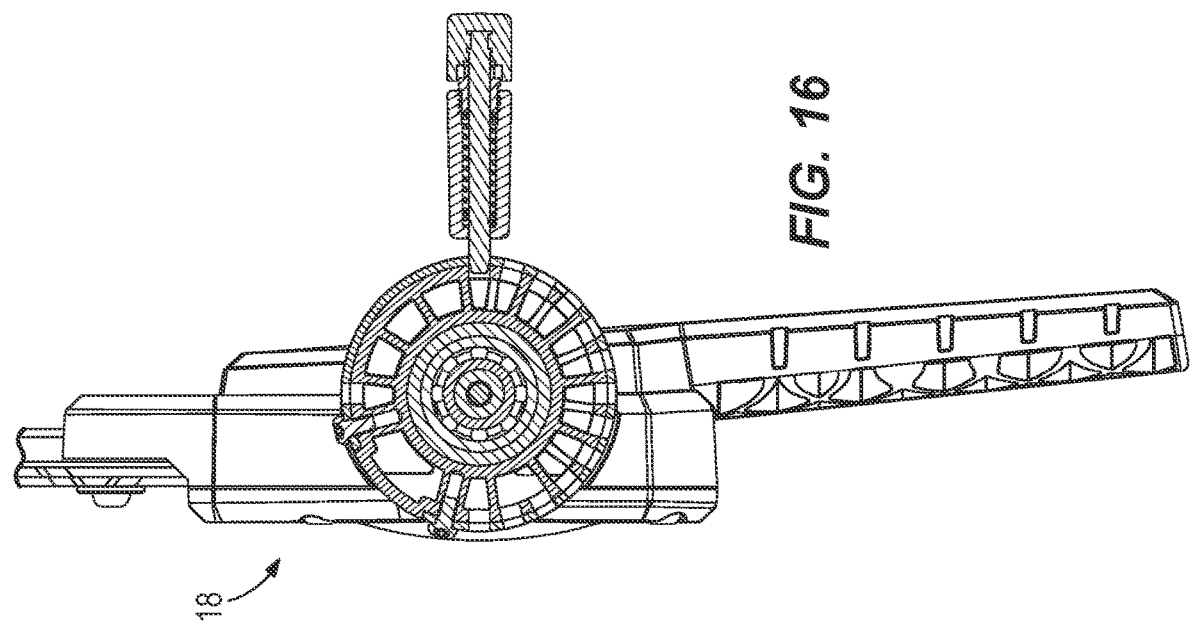
FIG. 16 is a cross-sectional side view of the portion of the hedge trimmer attachment as shown in FIG. 15, generally along a line similar to line 14-14 in FIG. 10.
Figure 15:
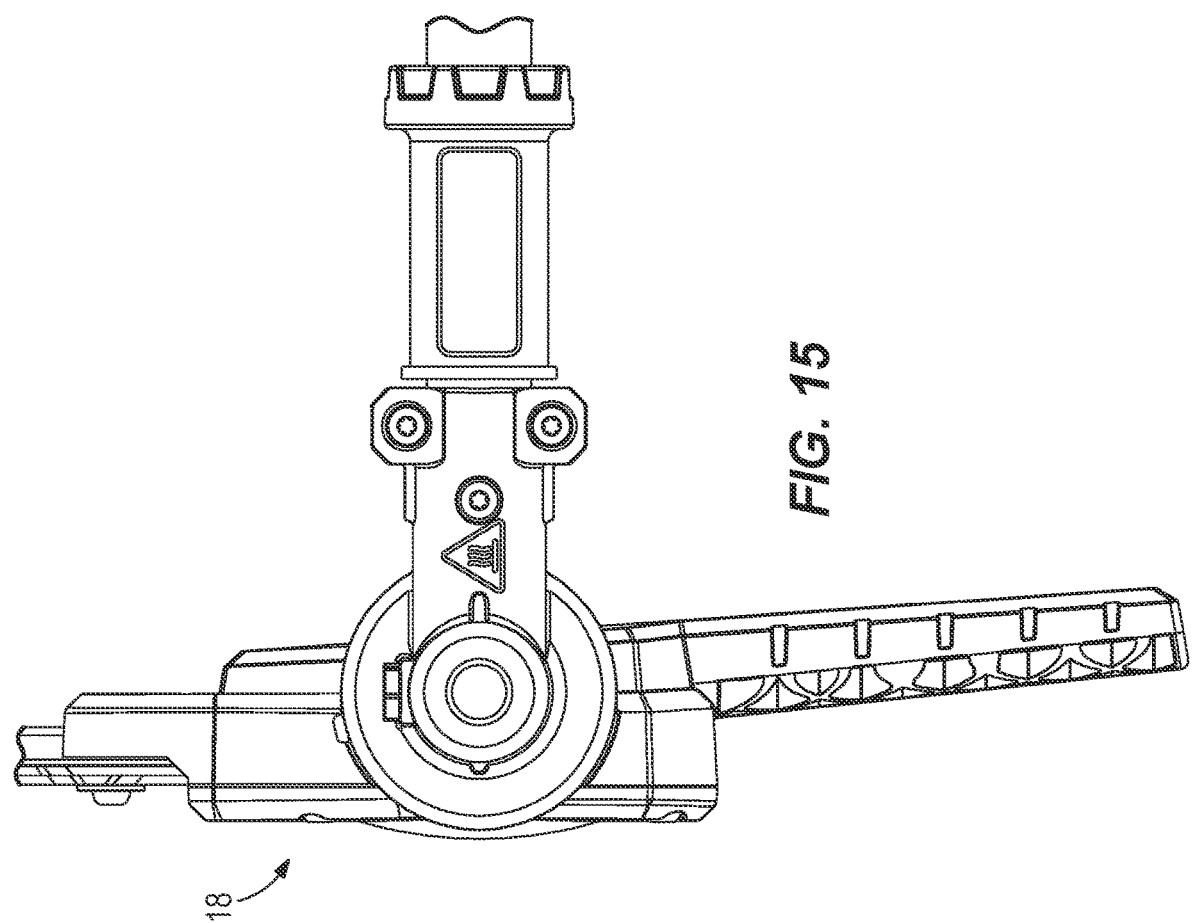
FIG. 15 is a side view of the hedge trimmer attachment as shown in FIG. 10, illustrating the blade assembly in a use position.

An annular ring or band 102 (FIG. 8) at least partially circumscribes the locking wheel 90 and includes apertures 106 positioned at intervals about a circumference of the band 102. The apertures are aligned with and communicate with (FIG. 14) radial recesses 108 formed in the locking wheel 90. The apertures 106 and recesses 108 correspond to positions of the movable housing 62, with the handle 70 and the blade assembly 26, relative to the fixed housing 58, including, in the illustrated construction, the storage position A and the use positions B-N.

Figure 11:
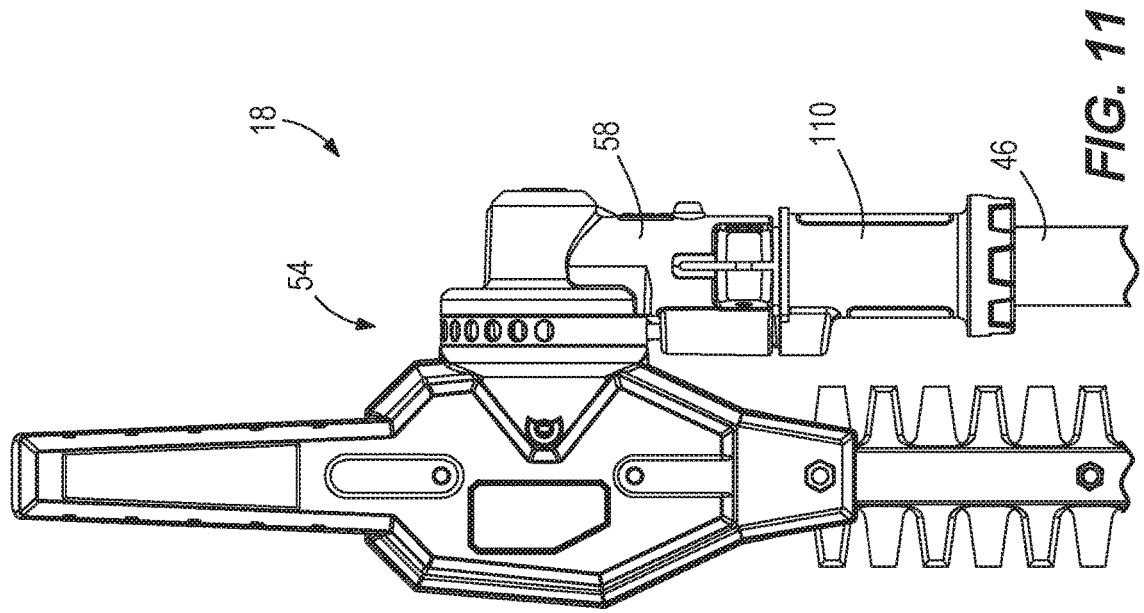
FIG. 11 is an enlarged rear view of the portion of the hedge trimmer attachment shown in FIG. 10.
Figure 10:
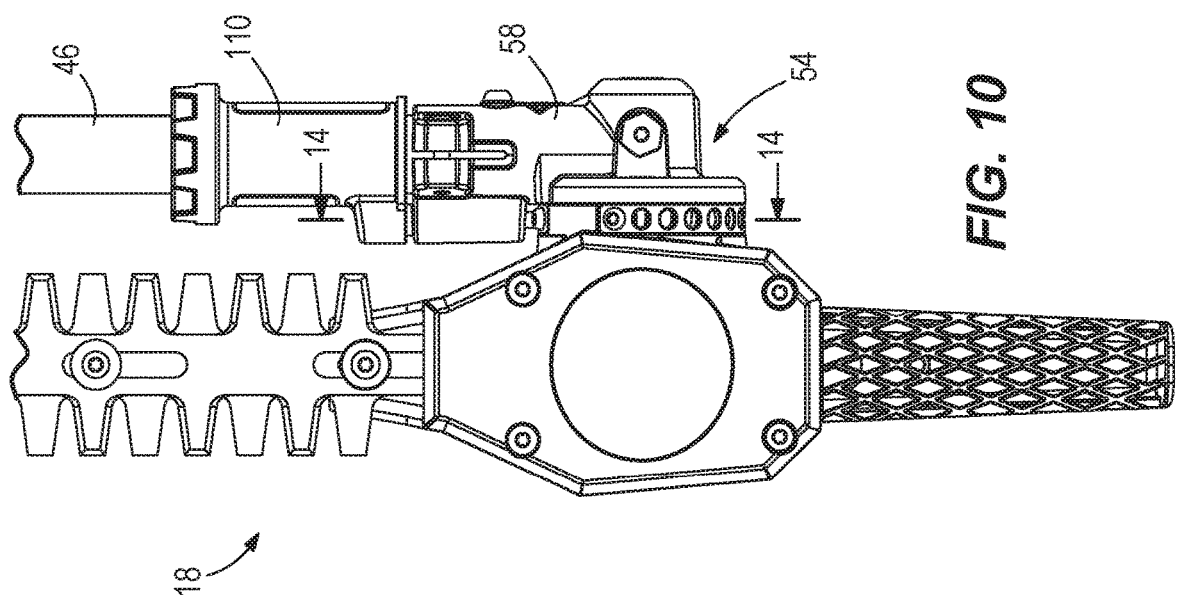
FIG. 10 is an enlarged front view of a portion of the hedge trimmer attachment of FIG. 2.
Figures 12, 13:
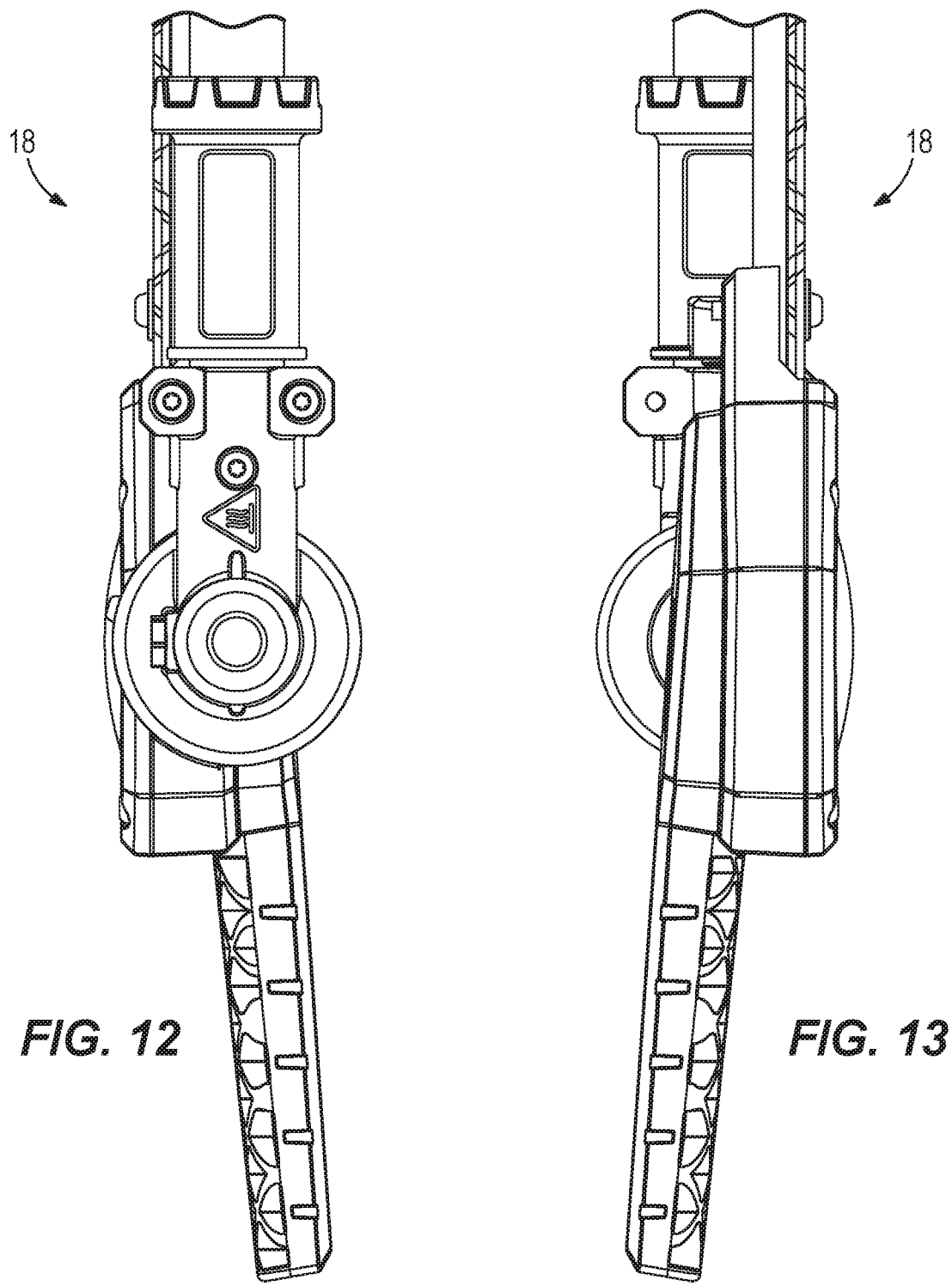
FIG. 12 is a side view of the portion of the hedge trimmer attachment as shown in FIG. 10.
FIG. 13 is another side view of the portion of the hedge trimmer attachment as shown in FIG. 10.

With reference to FIGS. 10-11, the hedge trimmer head 18 includes a locking sleeve 110 coupled to the second shaft segment 46 proximate the fixed housing 58. The locking sleeve 110 is axially slidable along the second shaft segment 46 toward and away from the fixed housing 58 and the movable housing 62 between a locked position (FIG. 10) and an unlocked position. In the locked position, the pivoting mechanism 54 is locked against pivoting movement. In the unlocked position, pivoting movement of the movable housing 62, along with the blade assembly 26, relative to the second shaft segment 46 is permitted.

Figure 20:
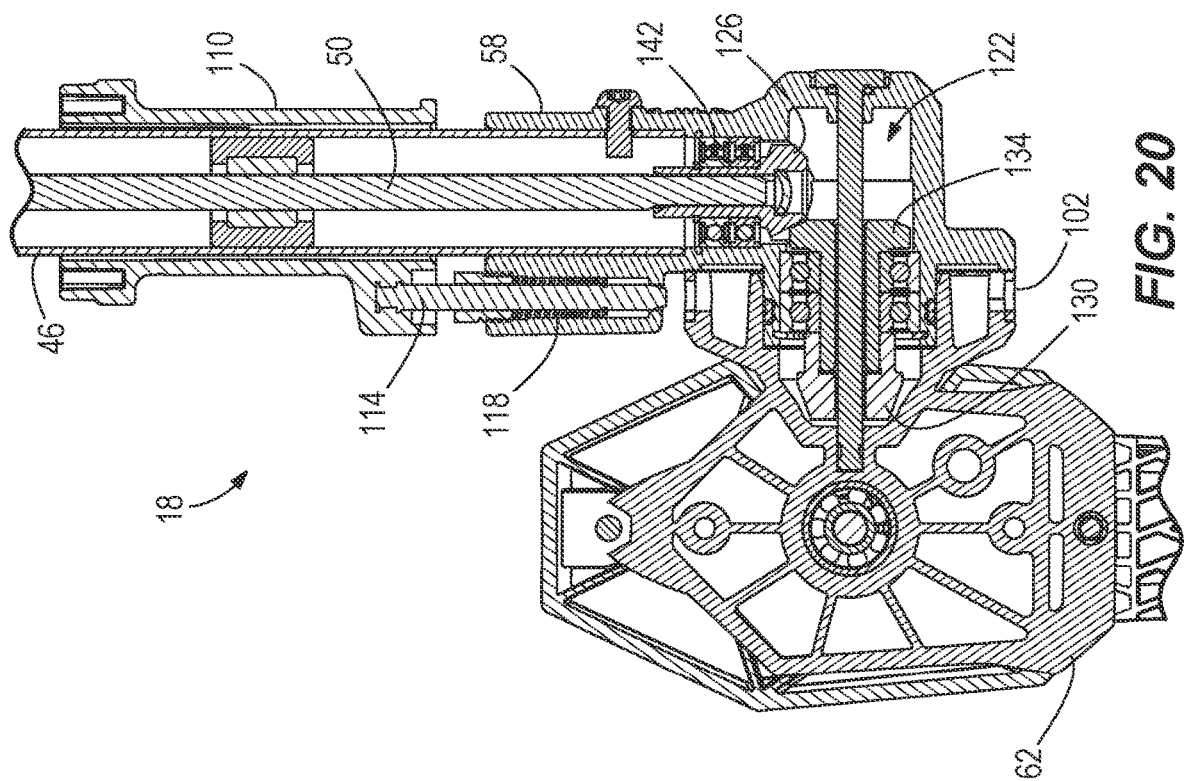
FIG. 20 is a cross-sectional front view of the portion of the hedge trimmer attachment as shown in FIG. 19, generally along a line similar to line 17-17 in FIG. 2.

With reference to FIG. 20, a locking pin 114 is supported by one end of the locking sleeve 110 and is slidably received by the fixed housing 58. A spring 118 biases the locking pin 114 and the locking sleeve 110 toward the locked position (e.g., through engagement between the locking pin 114 and the fixed housing 58). A distal end of the locking pin 114 opposes the band 102 on the movable housing 62.

Figure 19:
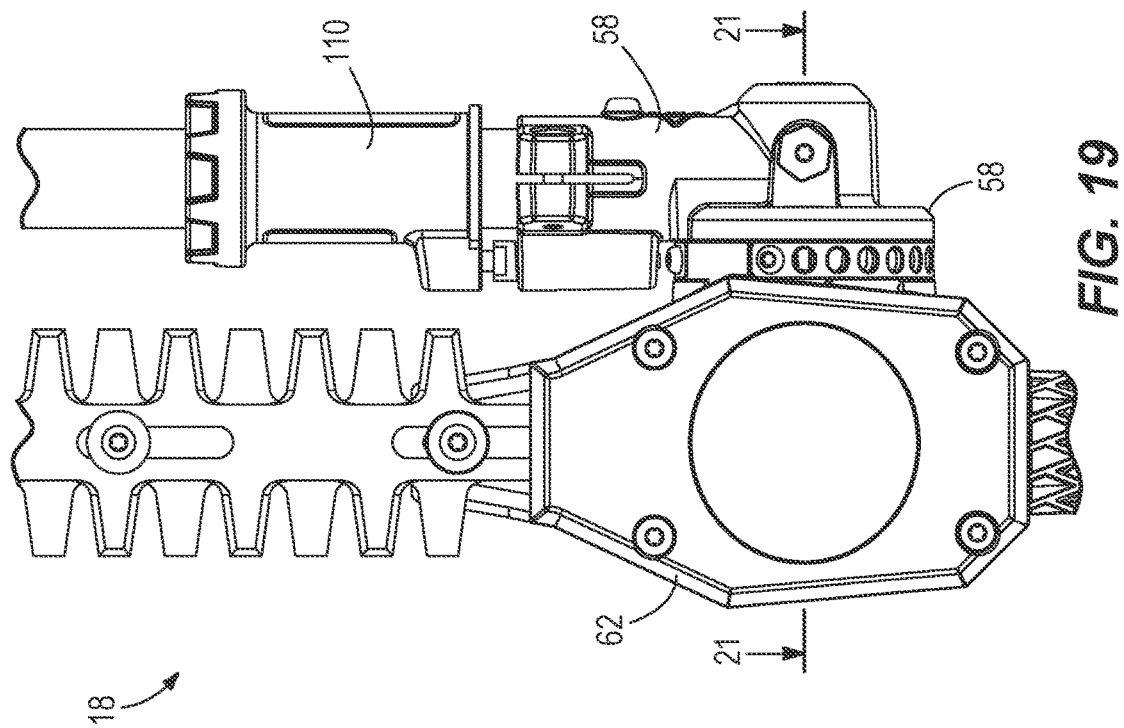
FIG. 19 is another front view of a portion of the hedge trimmer attachment of FIG. 2.

When the sleeve 110 is in the locked position (FIG. 10), the distal end of the locking pin 114 is received by a selected one of the apertures 106 and engages the band 102 to hold the movable housing 62 in a selected pivoted position relative to the fixed housing 58 and to prevent relative pivoting movement of the housings 58, 62. When the sleeve 110 is moved to the unlocked position (FIG. 19), the distal end of the locking pin 114 exits the apertures 106, so that the movable housing 62 may subsequently be pivoted relative to the fixed housing 58. Once the sleeve 110 is released after disengagement, the end of the locking pin 114 is biased by the spring 118 against the surface of the band 102 and will ride along the surface of the band 102 until the end of the locking pin 114 aligns with one of the recesses 106.

Figure 21:
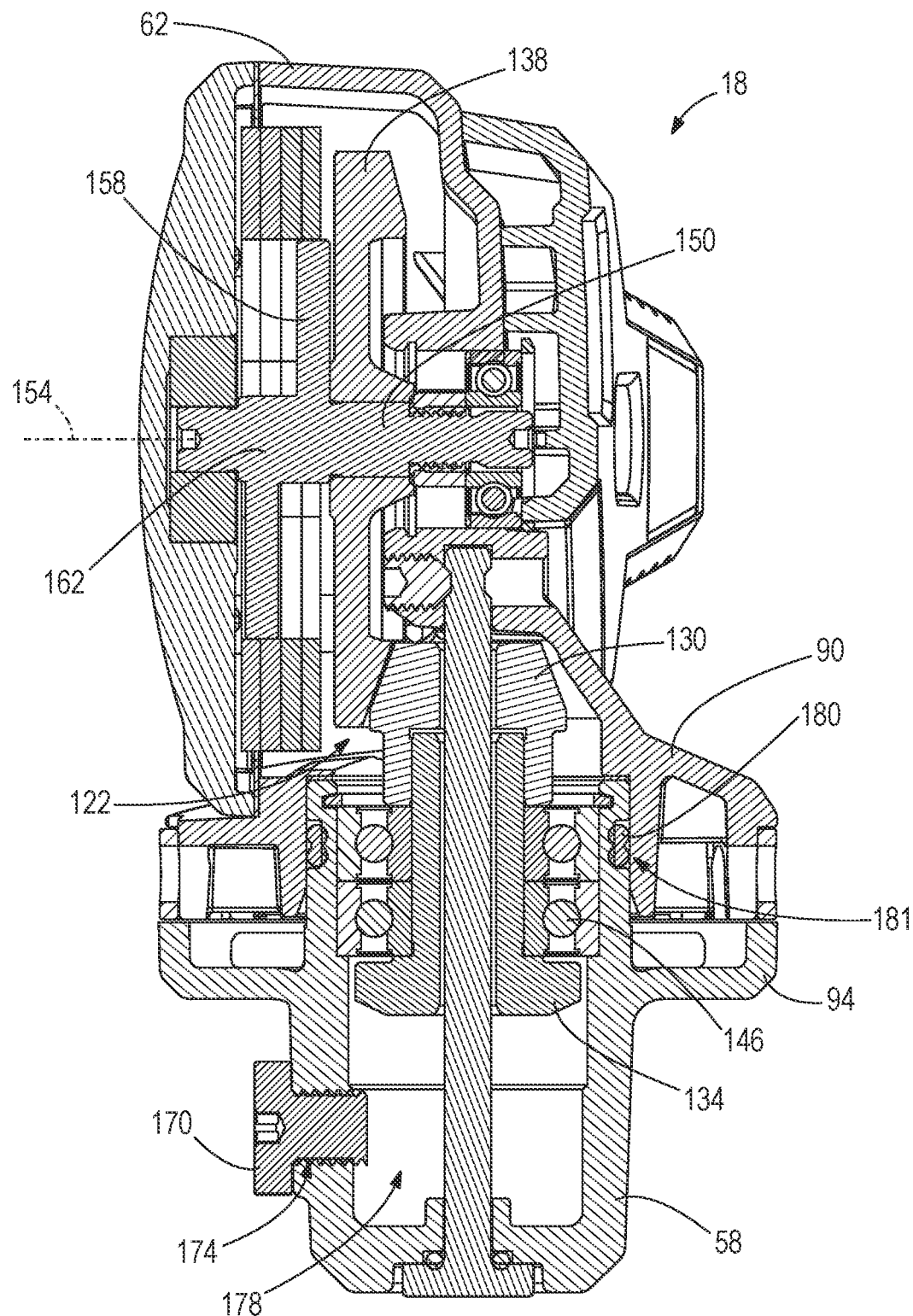
FIG. 21 is a cross-sectional end view of the hedge trimmer attachment of FIG. 2, taken generally along line 21-21 of FIG. 19.

With reference to FIGS. 20 and 21, the second driveshaft segment 50 terminates within the fixed housing 58. A gear system 122 transmits and converts the rotary motion of the second driveshaft segment 50 to the reciprocating motion of the blade assembly 26. The gear system 122 includes input gears 126, 130, and output gears 134, 138. The first input gear 126 is fixed to the second shaft segment 46 within the fixed housing 58 and supported by a first bearing 142 for rotation about the shaft axis 14. The first output gear 134 is supported within the fixed housing 58 by a second bearing 146 for rotation about the pivot axis 66. The first input gear 126 engages and drives the first output gear 134 when the second driveshaft segment 50 is rotated. The second input gear 130 is fixed to the first output gear 134 for co-rotation with the first output gear 134.

Figure 22:
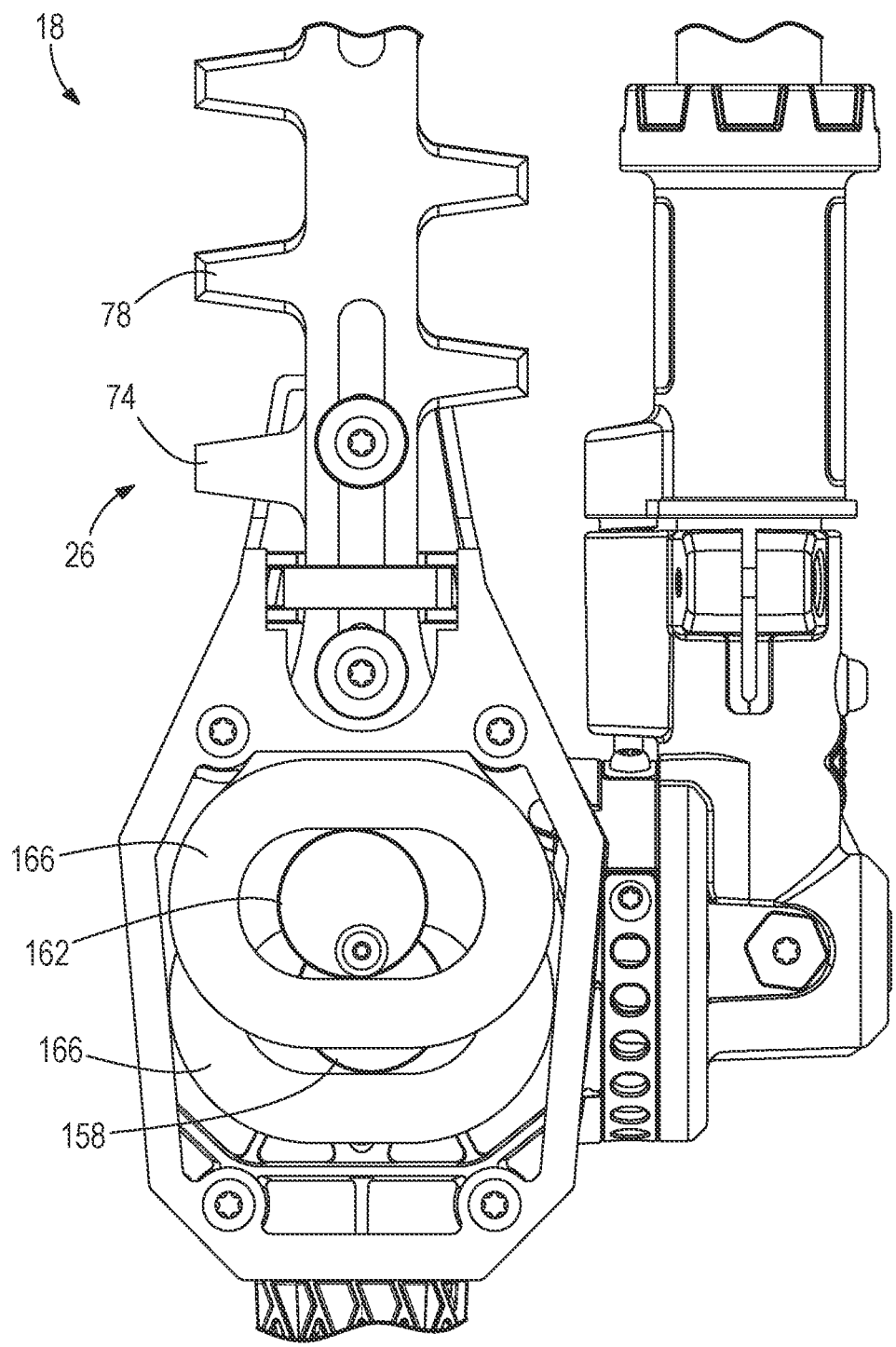
FIG. 22 is a front view of a portion of the hedge trimmer attachment of FIG. 2, with a housing cover removed.

With reference to FIGS. 21 and 22, the second output gear 138 is supported within the movable housing 62 and affixed to a crankshaft 150. The second input gear 130 engages and drives the second output gear 138, which in turn rotates the crankshaft 150 about a crankshaft axis 154. The crankshaft 150 supports two opposed cams 158, 162 for concentric rotation about the crankshaft axis 154.

In the illustrated construction, each blade 74, 78 is reciprocatable relative to the movable housing 62. With reference to FIG. 22, each blade 74, 78 includes a yoke 166 supported within the movable housing 62. Each cam 158, 162 engages the respective yoke 166 to drive the associated blade 74, 78 to reciprocate in opposite directions during operation of the outdoor tool T. In the illustrated embodiment, the blades reciprocate at speeds up to about 3,700 strokes per minute (SPM) with a blade stroke of up to about 1 inch.

As shown in FIG. 21, a lubricant plug 170 threadably engages a lubricant opening 174 in the fixed housing 58. The fixed housing 58 defines a lubricant chamber 178 receiving lubricant (e.g., grease, oil, etc.) for lubricating working components (e.g., the gear assembly 122, the crankshaft 150, etc.) of the hedge trimmer head 18. Operation of the gear assembly 122 and motion of components of the hedge trimmer head 18 during operation of the outdoor tool T, distributes the lubricant from the lubricant chamber 178 to components in the fixed housing 58 and to the movable housing 62 to lubricate components in the movable housing 62.

In other constructions (not shown), the hedge head 18 may include an oil pump driven, for example, through operation of the gear assembly 122. A similar oiling mechanism is described in U.S. Provisional Patent Application No. 62/675,663, filed May 23, 2018, entitled "POLE SAW", and in corresponding U.S. patent application Ser. No. 16/417,716, filed May 21, 2019, entitled "POLE SAW", the entire contents of which is hereby incorporated by reference.

Continuing with FIG. 21, an elastomeric seal 180 (e.g., an O-ring) surrounds a portion of the hub 94 of the fixed housing 58. A portion of the wheel 90 of the movable housing 62 surrounds the seal 180, so that the seal 180 reduces wear between the hub 94 and the wheel 90 and seals the working components (e.g., the gear assembly 122, the crankshaft 150, etc.) of the hedge trimmer head 18.

In the illustrated embodiment, the seal 180 is provided as a pair of adjacent or side-by-side connected rings as shown in FIG. 21. The seal 180 is seated within a groove 181 defined about a portion of the hub 94 such that the seal 180 remains fixed relative to the hub 94. When the sleeve 110 is moved to the unlocked position (FIG. 19), a friction developed between the seal 180 and the wheel 90 prevents the movable housing 62 from freely pivoting relative to the fixed housing 58 (e.g., due to the effects of gravity acting on the hedge trimmer head 18). That is, the seal 180 helps to hold the movable housing 62 and associated components (e.g., the handle 70 and the blade assembly 26) stationary relative to the fixed housing 58, until the user applies a torque to the movable housing 62 to pivot the movable housing 62 relative to the fixed housing 58.

Figure 24:
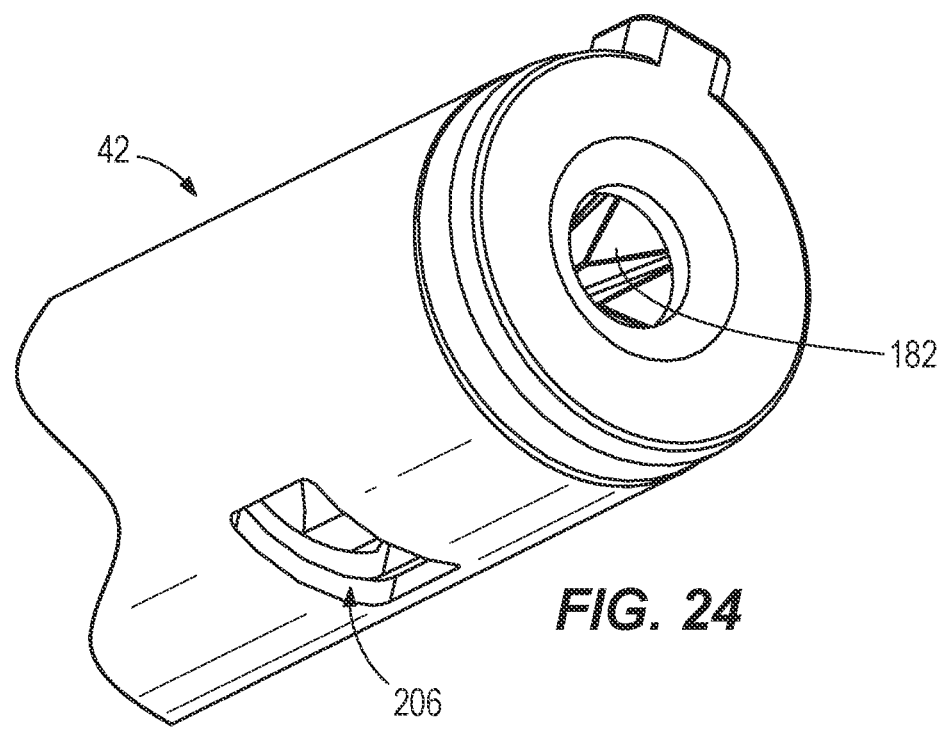
FIG. 24 is another perspective end view of the connecting portion as shown in FIG. 23.
Figure 25:
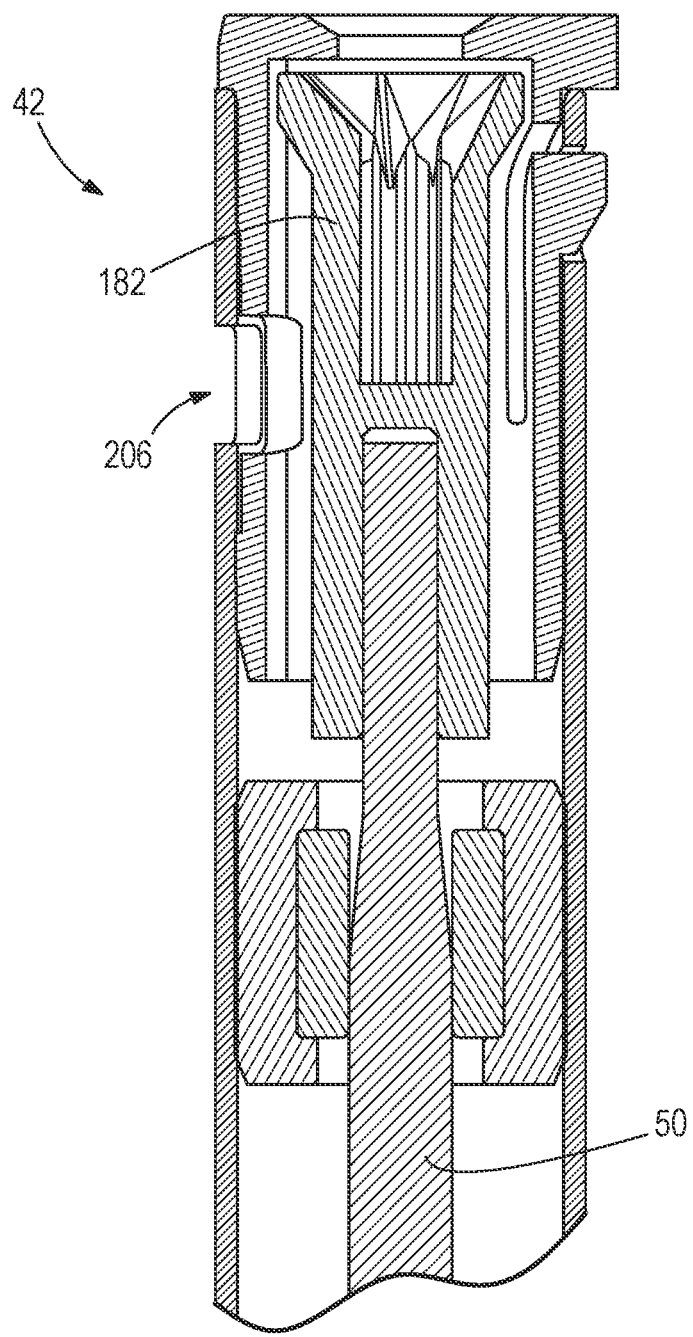
FIG. 25 is a cross-sectional side view of the connecting portion as shown in FIG. 23, taken generally along line 25-25.

With reference to FIGS. 23-27, the attachment unit 34 also includes the second connecting portion 42 that selectively couples to the first connecting portion 38 of the powerhead unit 30. In the illustrated construction, the second driveshaft segment 50 terminates at the second connecting portion 42 in a spline hub 182 (FIG. 25). When the powerhead unit 30 is coupled to the attachment unit 34, a spline 186 (FIGS. 26-27) on the first driveshaft segment 46 selectively engages and rotatably couples to the spline hub 182 to transmit rotary power from the first driveshaft segment 48 to the second driveshaft segment 50 and, therethrough, from the powerhead unit 30 to the hedge trimmer head 18.

Figure 27:
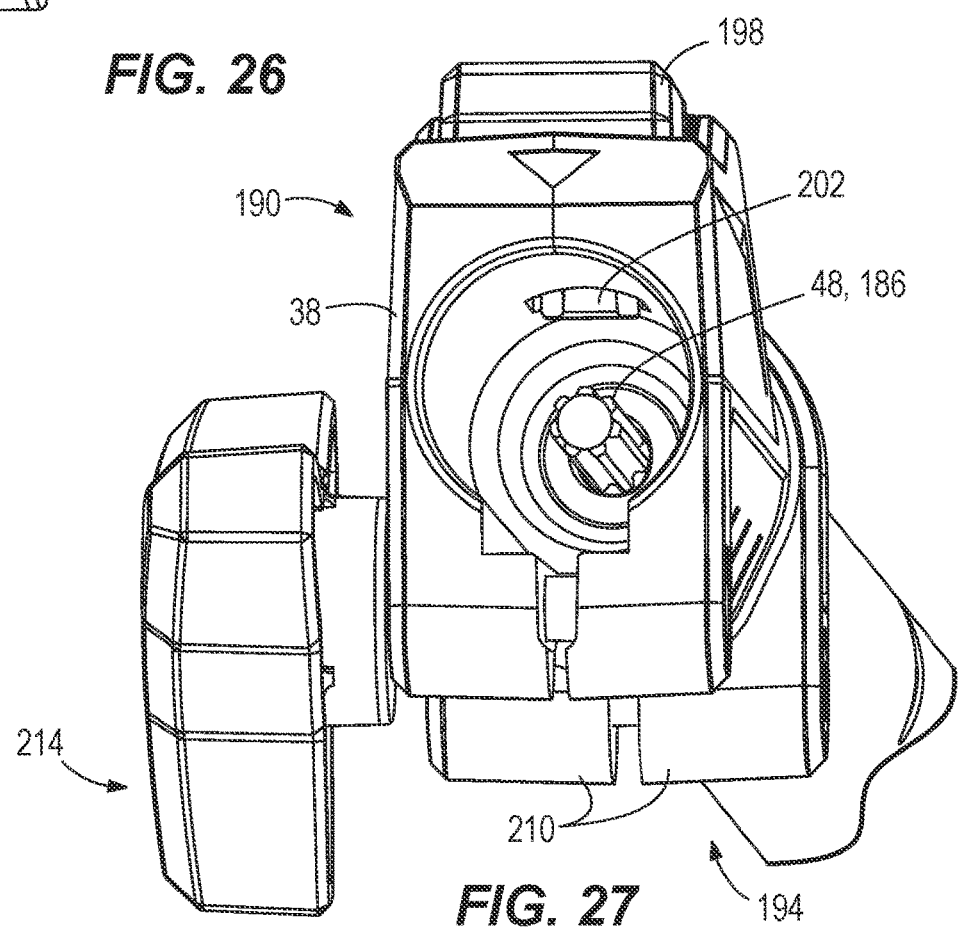
FIG. 27 is another perspective end view of the connecting portion as shown in FIG. 26.

As described in more detail in U.S. Provisional Patent Application No. 62/675,661, filed May 23, 2018, entitled "POWERHEAD UNIT FOR TOOL", and in corresponding U.S. patent application Ser. No. 16/417,713, filed May 21, 2019, entitled "POWERHEAD UNIT FOR TOOL", as shown in FIGS. 24 and 27, a retainer assembly (e.g., a quick-release mechanism 190 and a clamping mechanism 194) is provided between the connecting portions 38, 42. The illustrated mechanism 190 includes a spring-biased button 198 with a projection 202 engageable in a recess 206 (FIG. 24) to selectively and releasably retain the connecting portions 38, 42. The connecting portion 38 is formed with clamping flanges 210 engaged by a clamping actuator 214 (e.g., a bolt and nut) to apply a clamping force to the connecting portion 42.

One or more independent features and/or independent advantages of the invention may be set forth in the claims.

What is claimed is:

1. An outdoor tool comprising:
    a powerhead;
    a tool portion operatively powered by the powerhead;
    an elongated shaft assembly defining a longitudinal shaft axis between the powerhead and the tool portion, the tool portion including:
        a first housing fixed to the shaft assembly;
        a second housing coupled to the first housing for pivoting movement about a pivot axis, the second housing including a locking wheel that defines a plurality of radial recesses;
        a blade assembly supported by the second housing;
        a lock mechanism movable between a locked position, in which relative movement between the second housing and the first housing is prevented, and an unlocked position, in which the second housing is movable relative to the first housing, the lock mechanism including a locking ring supported about the locking wheel and defining a plurality of apertures such that the plurality of apertures align with the plurality of radial recesses; and
        an elastomeric seal disposed between the first housing and the second housing and configured to inhibit relative movement between the first housing and the second housing when the lock mechanism is moved to the unlocked position, the elastomeric seal comprising a pair of O-rings connected side by side.

2. The outdoor tool of claim 1, wherein the lock mechanism further includes a sleeve slidably supported by the shaft assembly for movement between the locked position and the unlocked position.

3. The outdoor tool of claim 2, wherein the lock mechanism further includes a pin supported by the sleeve and selectively engageable with the second housing.

4. The outdoor tool of claim 3, wherein the pin is received in one of the plurality of recesses to lock the second housing relative to the first housing.

5. The outdoor tool of claim 4, wherein each recess corresponds to a relative position of the second housing with respect to the first housing.

6. The outdoor tool of claim 5, wherein the locking ring extends about the pivot axis.

7. The outdoor tool of claim 3, wherein the pin is movable relative to the pivot axis between the locked position and the unlocked position.

8. The outdoor tool of claim 1, wherein the tool portion comprises a hedge trimmer.

9. The outdoor tool of claim 1, wherein the second housing is pivotable relative to the first housing to a storage position, in which the blade assembly is positioned alongside the shaft assembly.

10. The outdoor tool of claim 9, wherein the longitudinal shaft axis and the pivot axis define a first plane, and the blade assembly defines a blade plane, wherein in the storage position, the first plane and the blade plane are one of parallel and co-planar.

11. An outdoor tool comprising:
    an elongated shaft assembly defining a longitudinal shaft axis, the elongated shaft assembly including
        a first shaft segment,
        a first connecting portion attached to the first shaft segment,
        a second shaft segment, and
        a second connecting portion attached to the second shaft segment and configured to selectively and removably couple to the first connecting portion;
    a powerhead coupled to the first shaft segment;
    a tool portion coupled to the second shaft segment, the tool portion being powered by the powerhead, the tool portion including
        a first housing fixed to the shaft assembly;
        a second housing rotatably coupled to the first housing for pivoting movement relative to the first housing about a pivot axis; and
        a blade assembly supported by the second housing;
        a lock mechanism including
            a first member supported on the second housing to extend about the pivot axis, the first member defining a plurality of apertures; and
            a second member supported by the first housing and selectively engageable in the plurality of apertures to lock the second housing in a corresponding position relative to the first housing;
    wherein one of the first connecting portion and the second connecting portion includes a connecting recess, and the other of the first connecting portion and the second connecting portion includes a button having a projection selectively receivable in the connecting recess to releasably secure the first connecting portion to the second connecting portion; and
    wherein the second housing includes a locking wheel that defines a plurality of radial recesses, and wherein the first member is a locking ring supported about the locking wheel such that the plurality of apertures align with the plurality of radial recesses.

12. The outdoor tool of claim 11, wherein the second member is movable radially relative to the pivot axis between a locked position, in which relative pivoting movement between the second housing and the first housing is prevented, and an unlocked position, in which the second housing is pivotable relative to the first housing.

13. The outdoor tool of claim 12, wherein the lock mechanism further includes a sleeve supporting the second member, the sleeve being slidably supported by the shaft assembly for movement between the locked position and the unlocked position.

14. The outdoor tool of claim 12, wherein the tool portion further includes an elastomeric seal disposed between the first housing and the second housing and configured to inhibit relative movement between the first housing and the second housing when the second member is moved to the unlocked position, the elastomeric seal comprising a pair of O-rings connected side by side.

15. The outdoor tool of claim 11, wherein the second member is a pin and the pin extends along a pin axis, and further wherein the pin axis, the longitudinal shaft axis, and the pivot axis are arranged in a plane.

16. The outdoor tool of claim 11, wherein the second housing is pivotable relative to the first housing to a storage position, in which the blade assembly is positioned alongside the shaft assembly.

17. The outdoor tool of claim 16, wherein the longitudinal shaft axis and the pivot axis define a first plane, and the blade assembly defines a blade plane, wherein in the storage position, the first plane and the blade plane are one of parallel and co-planar.

18. The outdoor tool of claim 11, wherein the locking ring partially circumscribes the locking wheel.

19. An outdoor tool comprising:
a powerhead;
a tool portion operatively powered by the powerhead; and
an elongated shaft assembly defining a longitudinal shaft axis between the powerhead and the tool portion, the tool portion including:
a first housing fixed to the shaft assembly;
a second housing coupled to the first housing for pivoting movement about a pivot axis, the second housing including a locking wheel that defines a plurality of radial recesses;
a blade assembly supported by the second housing; and
a lock mechanism movable between a locked position, in which relative movement between the second housing and the first housing is prevented, and an unlocked position, in which the second housing is movable relative to the first housing, the lock mechanism including a locking ring supported about the locking wheel and defining a plurality of apertures such that the plurality of apertures align with the plurality of radial recesses.

\* \* \* \* \*